(Model.)

C. M. MUELLER.
MACHINE FOR SAWING STAVES.

No. 305,705. Patented Sept. 23, 1884.

Attest:
J. Walter Fowler
H. B. Applewhaite

Inventor:
Charles M. Mueller
per attys.
N. H. Evans & Co.

UNITED STATES PATENT OFFICE.

CHARLES M. MUELLER, OF LA CROSSE, WISCONSIN, ASSIGNOR OF ONE-HALF TO A. HIRSHHEIMER, OF SAME PLACE.

MACHINE FOR SAWING STAVES.

SPECIFICATION forming part of Letters Patent No. 305,705, dated September 23, 1884.

Application filed March 1, 1884. (Model.)

*To all whom it may concern:*

Be it known that I, CHARLES M. MUELLER, of La Crosse, in the county of La Crosse and State of Wisconsin, have invented a new and useful Improvement in Machines for Sawing Staves, of which the following is a full, clear, and exact description, reference being had to the accompanying drawings, making a part of this specification, in which—

Figure 1:
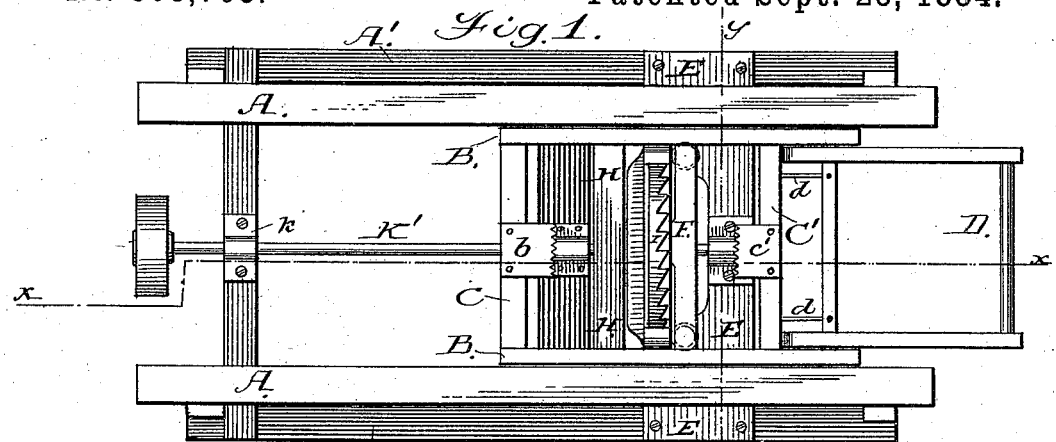
Figure 2:
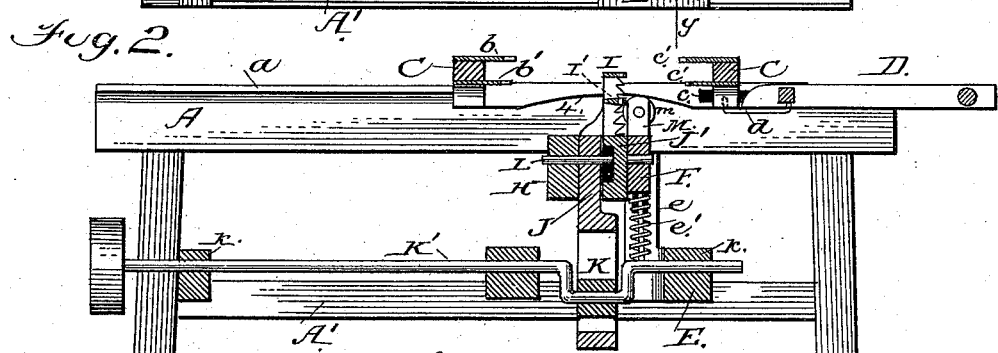
Figure 3:
Figure 4:
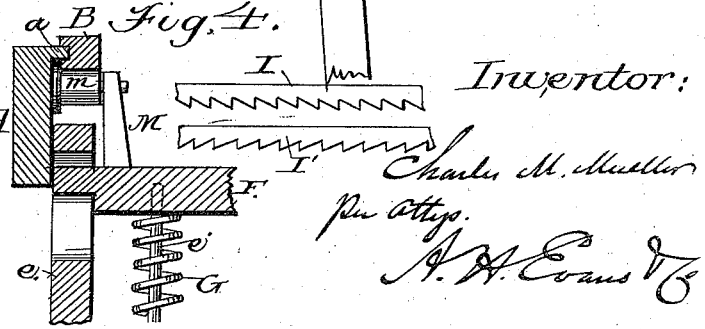

Figure 1 represents a plan view of a machine with my improvements attached. Fig. 2 is a longitudinal section on a line, $x\,x$, of Fig. 1. Fig. 3 is a transverse section on the line $y\,y$ of Fig. 1. Fig. 4 are details to be referred to.

My invention relates to that class of inventions used more especially for sawing barrel and other staves; and it consists in the several combinations of devices hereinafter explained and claimed.

To enable others skilled in the art to make and use my invention, I will proceed to describe the exact manner in which I have carried it out.

In the drawings, A represents the frame-work of my machine, provided with the flanges $a$, which act as guides for the carriage B.

On the forward end of the carriage B is rigidly secured the transverse curved beam C, which is provided on its upper and lower longitudinal centers with the serrated plates $b\,b'$, for a purpose hereinafter explained, the upper plate extending out from the beam slightly farther than the lower plate.

On the rear of the carriage B is another transverse curved beam, C', having its outer ends adapted to slide in slots $c$, on each side of the carriage, and provided with the serrated plates $c'$, the upper one being slightly longer than the lower one.

In the rear of the transverse beam C' is a frame or handle, D, for conveniently operating the carriage. To the front of this handle are attached the links $d$, which connect the handle to the curved beam C', and by means of which the beam C' may be moved from or toward the beam C, by simply raising or lowering the handle, thus adapting the serrated plates on the curved beams to clamp or release the timber, as may be desired.

On the lower frame-timbers, A', I secure the transverse plate E, which supports the operative mechanism. Rising from this plate, and secured to the upper portion of the frame A, are two standards, $e\,e$, slotted at their upper ends to receive the ends of cross-beam F, which has a vertical play in the slots.

Rising from the plate E, and alongside of the standards $e\,e$, are the bolts $e'\,e'$, which pass up into perforations or recesses in the lower part of the cross-beam F. On these bolts are placed the coiled springs G, between the plate E and the beam F, so that when pressure is applied above or on the beam F the springs G will allow the beam to be depressed, and as the pressure is relieved the beam will again rise to any predetermined height.

Forward of the cross-beam F, I secure rigidly to the upper timbers of the frame the cross-beam H, and between these beams I place two reciprocating saws, I and I', on concentric curves, one within the other, and secured to the oscillating frame J, pivoted between the beams F and H, and extending below the frames, where it is slotted to receive the sliding head K on the crank-shaft K', which has its bearings at $k$ on the cross-beams of the frame.

Within the oscillating frame J is formed a recess, in which fits an independent frame, J', having a vertical movement within the recess, allowed by means of a vertical central slot in the frame J at the point through which the pivot-pin L passes. When no pressure is brought to bear on the frame J', which is attached to the cross-beam F, the springs G keep the lower or inner saw at its maximum height; but pressure on the beam F necessarily depresses it, and with it the inside saw, for a purpose I will now proceed to explain.

It is well understood by those skilled in the art that in the manufacture of staves they are made thinner in their longitudinal centers than they are at their ends. To accomplish this I have the inner saw to automatically adjust itself so as to gradually diminish the thickness of the stave as it approaches the longitudinal center of the stave, and then gradually increase its thickness out to the opposite end.

Springing up from each end of the cross-beam F is an arm, M, bearing an anti-friction roller, m. On these rollers impinge the under side of the frame of the carriage B, as shown in Fig. 2. A depression, 4, formed in the under side of the frame, conforms, as nearly as may be, to the curve desired in the stave, and it is evident that as the roller approaches the depression 4 the carriage will allow the beam F and the saw I' to gradually rise and reduce the thickness of the stave, as desired, the saw in its progress conforming to the depression in the carriage-frame.

It will be noticed that I form my saws to cut in opposite directions, so that as the saws oscillate or reciprocate from side to side one of the saws is always at work, and the machine is relieved from the increased labor of driving both saws at the same time, as would be the case if the saws were formed so as to have both cut in the same direction.

In the use of my machine the lumber is first split into bolts, and these bolts are clamped and sawed into staves without loss.

It is evident that while I have shown and described only two saws, as many saws may be used as desired without departing from the spirit of my invention.

From my description of the serrated plates on the curved cross-beams C C' it will be evident that the upper plates are for clamping and holding the "bolt" of lumber while being sawed, and the lower plates hold the stave which is being sawed from the bolt. When the curved cross-beam C' is moved back, as hereinbefore described, to release and let fall the sawed stave, the upper plates, being the longer, still clamp and hold the bolt.

Having thus described my invention, what I claim as new, and desire to secure by Letters Patent, is—

1. In a machine for sawing staves, the carriage B, having the transverse curved beams C C', and provided with depressions 4, in combination with the arms M, friction-rollers m, and springs G, all constructed to operate substantially as and for the purpose set forth.

2. In a machine for sawing staves, the carriage B, having the transverse curved beams C C', with the serrated plates b b' and c c', the upper plates being slightly longer than the lower ones, and provided with the depressions 4, in combination with the frame A, cross-beam F, arms M, and rollers m, all constructed to operate substantially as and for the purpose set forth.

3. The slotted oscillating frame J, recessed as desired, and independent frame J', adapted to slide vertically in said recess, in combination with the saws I I', the cross-beams F H, sliding head K, and crank-shaft K', all constructed to operate substantially as and for the purpose set forth.

4. The oscillating frame J, recessed as described, independent frame J', and saws I I', in combination with the cross-beams F H, arms M, rollers m, carriage B, provided with the depression 4, and frame A, all constructed to operate substantially as and for the purpose set forth.

5. The slotted oscillating frame J, independent frame J', and saws I I', in combination with the cross-beam F, bolts e, springs G, arms M, rollers m, and carriage B, provided with depressions 4, and frame A, all constructed to operate substantially as and for the purpose set forth.

6. The frame A, carriage B, having the curved cross-beams C C', provided with the serrated plates b b' and c c', in combination with the handle D and links d d, substantially as and for the purpose set forth.

CHAS. M. MUELLER.

Witnesses:
T. WALTER FOWLER,
H. B. APPLEWHAITE.